United States Patent

McNeill

[11] 4,106,300
[45] Aug. 15, 1978

[54] METHOD OF MAKING REINFORCED CAST-IN-PLACE CONCRETE PIPE

[75] Inventor: Charles T. McNeill, Yuba City, Calif.

[73] Assignee: No-Joint Concrete Pipe Co., Yuba City, Calif.

[21] Appl. No.: 706,891

[22] Filed: Jul. 19, 1976

Related U.S. Application Data

[63] Continuation of Ser. No. 469,517, May 13, 1974, abandoned.

[51] Int. Cl.² .......................... B28B 21/88; E03F 3/06
[52] U.S. Cl. .......................................... 61/72.2; 106/99; 138/105; 264/31; 425/59
[58] Field of Search ....................... 61/722; 264/31-35; 425/59, 64; 106/99, 97, 90, 89; 138/175, 153

[56] References Cited

U.S. PATENT DOCUMENTS

| | | | |
|---|---|---|---|
| 2,463,561 | 3/1949 | Riley | 106/99 |
| 2,677,955 | 5/1954 | Constantinesco | 428/221 |
| 3,429,094 | 2/1969 | Romualdi | 52/659 |
| 3,551,537 | 12/1970 | Thomason | 61/72.2 |
| 3,606,278 | 9/1971 | Winfrey | 259/172 |
| 3,650,785 | 3/1972 | Ball et al. | 106/90 |

*Primary Examiner*—Jacob Shapiro
*Attorney, Agent, or Firm*—Phillips, Moore, Weissenberger, Lempio & Majestic

[57] ABSTRACT

Cast-in-place concrete pipe reinforced with fibers and the method of making such reinforced cast-in-place concrete pipe is disclosed. The apparatus used in making such reinforced cast-in-place concrete pipe is described.

1 Claim, 6 Drawing Figures

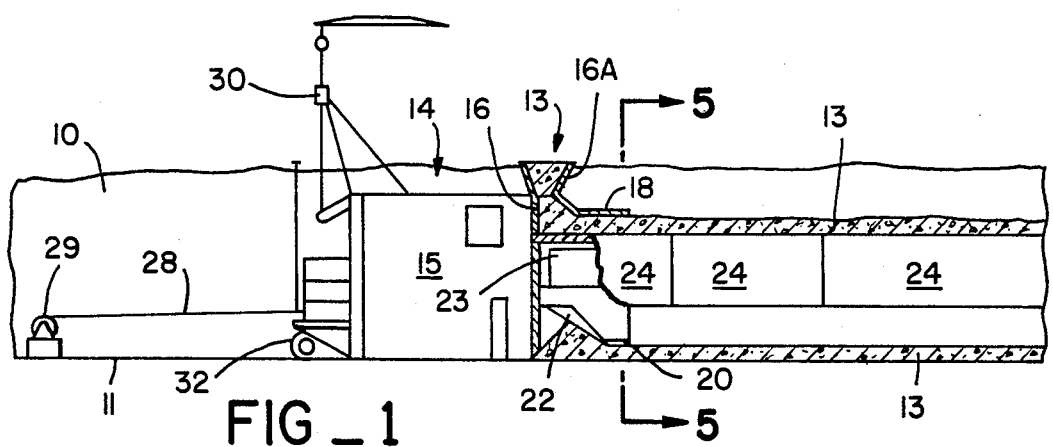
FIG_1
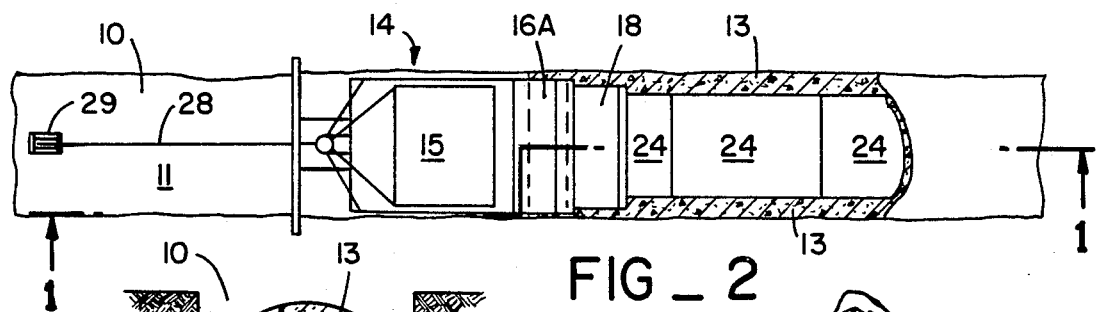
FIG_2
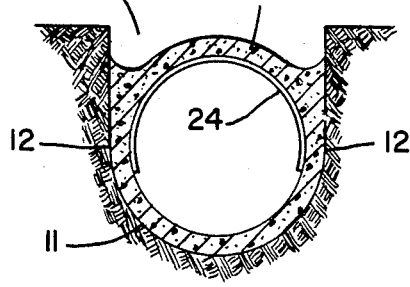
FIG_5
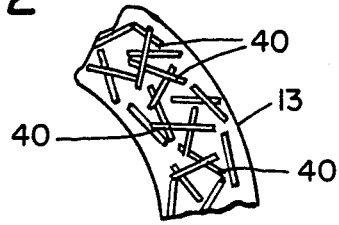
FIG_6
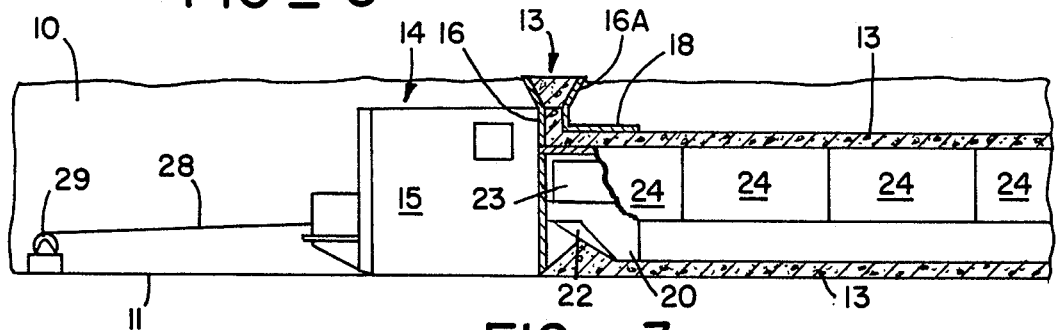
FIG_3
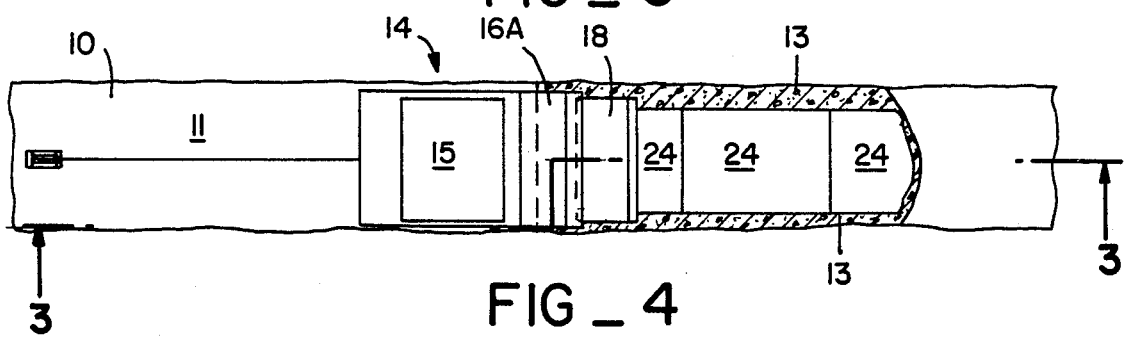
FIG_4

METHOD OF MAKING REINFORCED CAST-IN-PLACE CONCRETE PIPE

This application is a continuation of application Ser. No. 469,517 filed May 13, 1974 and was abandoned.

BACKGROUND OF THE INVENTION

This invention relates to substantially continuous concrete pipe cast-in-place in a ditch or the like and more particularly to a reinforced cast-in-place concrete pipe and method of making it.

U.S. Pat. No. 2,731,698, entitled "Apparatus For Forming Concrete Pipe In Situ" discloses a machine invented by E. LeRoy Tunsen which has been found extremely effective in casting substantially continuous concrete pipe of moderate size (i.e. about 24 inches to about 48 inches in diameter) in place in a ditch or the like for use as storm drains, irrigation pipe, sanitary outfall sewers, underground canals, etc. U.S. Pat. No. 3,534,449 entitled "Apparatus For Forming Concrete Pipe In Situ" discloses improvements in such machine invented by C. H. Blixt and W. E. Cozby which have been found to be extremely effective in casting continuous concrete pipe of large size (i.e. from about 54 inches to at least 120 inches in diameter) in place in a ditch or the like for such uses.

An important advantage of the machines disclosed in the above patents is that they are capable of successfully casting pipe in place form a relatively wide range of concrete mixes supplied thereto. The publication of the American Concrete Institute entitled "Specification For Cast-in-place Nonreinforced Concrete Pipe", ACI Publication No. 346-70, defines the range of concrete mixes that can be successfully cast-in-place using the machines of the above patents.

Various schemes have been proposed for reinforcing the continuous concrete pipe cast-in-place by the machines of the above patents. However, all of such proposals have either introduced undesirable complications in the operation of such machines or have affected the range of concrete mixes which could be successfully used, or both.

It is an object of this invention to provide a reinforced concrete pipe which may be cast-in-place using the machines of the above patents.

It is another object of this invention to provide a method of reinforcing concrete pipe continuously cast-in-place by machines of the above patents which will neither introduce undesirable complications into the operation of such machines nor limit the range of concrete mixes which may be successfully used by such machines.

SUMMARY OF THE INVENTION

According to this invention there is included in the cast-in-place concrete pipe from about one-half percent to about 4 percent by weight of the concrete in such pipe, of fibers substantially uniformly distributed throughout, such fibers having a diameter of about 10 mils and a length between about one-half inch and 2 inches. The method of making such cast-in-place pipe according to this invention includes the step of gradually adding such fibers to the mixed concrete immediately prior to placing the mixed concrete into the pipe casting apparatus.

BRIEF DESCRIPTION OF THE DRAWING

The foregoing objects and features of this invention will be more fully understood from a reading of the following detailed description in conjunction with the appended drawing wherein:

FIG. 1 is a side view partly in elevation and partly in cross-section of apparatus, specifically adapted for casting in place concrete pipe having a diameter in excess of 48 inches, in operation in a ditch or the like.

FIG. 2 is a top plan view of the apparatus of FIG. 1 with the cast-in-place concrete pipe broken away to show the upper inner forms of the apparatus.

FIG. 3 is a side view, partly in elevation and partly in cross-section of apparatus for casting in place concrete pipe having a diameter of 48 inches or less, shown in operation in a ditch or the like.

FIG. 4 is a top plan view of the apparatus of FIG. 3 with the cast-in-place concrete pipe broken away to show the upper inner forms of the apparatus.

FIG. 5 is a cross-sectional view of the cast-in-place concrete pipe taken along lines 5—5 of FIG. 1.

FIG. 6 is an enlarged fragmentary cross-sectional view of a portion of the cast-in-place concrete pipe of FIG. 5 showing the inclusion of fibers according to this invention.

DETAILED DESCRIPTION OF PREFERRED EMBODIMENT

Referring to the drawing, FIGS. 1 and 2 show generalized side and top views of the apparatus disclosed and claimed in U.S. Pat. No. 3,534,449 referred to herein-above whereas FIGS. 3 and 4 show generalized side and top views of apparatus according to the teaching of U.S. Pat. No. 2,731,698 mentioned herein-above. Insofar as this invention is concerned, the operation of the apparatus shown in FIGS. 1 and 2 is the same as the operation of the apparatus shown in FIGS. 3 and 4 and for this reason like reference numerals will be used in the drawing to designate equivalent elements.

As described in the above mentioned patents, this invention contemplates the digging of a ditch 10 in the ground, having a bottom portion 11 shaped to conform to the part of the pipe to be cast directly in the ground. Mixed concrete 13 including reinforcing fibers according to the teaching of this invention is poured into the mechanism 14 which provides the form, in conjunction with the formed ground surface, against which the concrete mass is to be poured. The mechanism 14 is moved lengthwise along the earthen ditch 10, and the mixed concrete is poured into the mechanism for distribution and formation of the pipe in a continuous manner within the ditch.

In the formation of the pipe, the ditch 10 is formed to the desired depth, shape and grade. In the embodiments shown in the drawing, the bottom 11 of the ditch 10 is semi-circular in cross-section and provides the lower outer form portion for the pipe. As shown in FIG. 5, the ditch 10 preferably has substantially vertical side walls 12.

The mechanism 14 includes a forward frame 15 having a semi-cylindrical bottom portion which conforms to the bottom 11 of the ditch 10. The semi-cylindrical bottom portion of the frame 15 merges into parallel side members that are adapted to slide along the walls 12 of the ditch 10.

The structure of the mechansm 14 rearwardly of the frame 15 includes a leading end defining a wall 16 having a configuration substantially conforming to the cross-sectional configuration of the ditch 10 and a hopper 16A into which the mixed concrete 13 is poured. Extending rearwardly of, and secured to the hopper 16A, is an arcuate upper outer form member 18 which produces and forms the upper and outer surface of the concrete pipe. Disposed below the upper outer form member 18 is a lower inner form member 20 of arcuate shape which produces and forms the lower inner surface of the concrete pipe. The lower inner form member 20 projects from an inclined spreader member 22 which is mounted on the rearward end of the frame 15.

The lower inner form member 20 includes upwardly extending sides 23 (see FIGS. 1 and 3) which support upper inner form members 24 as they are fed from the frame portion 15 of the mechanism 14 under the wall 16 and upper outer form member 18 in sequential end-to-end relationship with each other. Such upper inner form members 24 are semi-cylindrical in cross-section with their lower edges extending substantially below the axis of the pipe. Means are provided at the ends of the upper inner form members 24 to mechanically couple them together in end-to-end relationship.

It will be understood that the mechanism 14 is moved longitudinally along the ditch 10 as by means of a cable 28 extending from a winch included in the apparatus 14 to an appropriate dead man or pulling point 29 spaced along the ditch in front of the mechanism 14. The mechanism 14 also includes an appropriate power source such as a gasoline engine, for example, to drive the winch and thereby wind the cable 28 thereon to pull the mechanism 14 longitudinally along the ditch.

It will be understood that a plurality of upper inner forms 24 may be distributed alongside the ditch 10 ahead of the machine 14 in such a way as to be accessible for placement in the machine 14 one at a time as needed. Thus, as the machine 14 moves longitudinally along the ditch 10, the upper inner forms 24 are fed through the machine and remain with the pipe as cast until the pipe has initially set and hardened sufficiently to permit removal of such upper inner forms for subsequent reuse.

It will be understood that the upper inner forms 24 for use in making pipe up to a diameter about 48 inches are small enough to be inserted into the machine 14 by hand. However, the upper inner forms 24 for use in making pipe having diameters of about 54 inches and above become very heavy and difficult to handle manually. In fact, the overall machine 14 used in making pipe having diameters of 54 inches and above becomes very heavy (i.e. in the order of 25-30 tons).

Thus, the machine 14 shown in FIGS. 3 and 4 of the drawing is suitable for use in making pipe up to about 48 inches in diameter. As shown in FIGS. 1 and 2, a machine 14, suitable for use in making pipe of diameters larger than 48 inches includes a crane 30 for handling upper inner form members 24 of the size and weight required to withstand the weight of the concrete in making larger diameter of pipe. For example, a cubic yard of concrete weighs about two tons and makes little more than one foot of pipe having a diameter of 96 inches. As best shown in FIG. 1, the machine 14 may be provided with an endless track 32 mounted in a slot in the bottom of the frame member 15 in order to support the machine 14 on the bottom 11 of the ditch 10 and facilitate its longitudinal movement along the ditch.

In the operation of the machines 14, the mixed concrete 13 is supplied to the hopper 16A from a ready-mix truck by which the concrete is transported to the point of utilization. It will be understood that the pipe is usually cast in ditches which are remote from any source of supply thus requiring transportation of all materials used in making the pipe, often over large distances.

It is well known that concrete has a low tensile strength although its strength in compression is very high. Thus it is conventional in building concrete structures to embed structural members of metal or other high tensile strength materials in the concrete. Such structural members are usually elongated rods or beams intended to substitute for the concrete in providing tensile strength. However, such structural members do not generally become effective until after the concrete in which they are embedded has already cracked.

For this reason, the embedding of elongated rods or beams of high tensile strength material in cast-in-place concrete pipe although feasible, would not be particularly effective in reinforcing the pipe at least against cracking. Various schemes have been proposed for embedding woven materials of various kinds in the concrete pipe as it is cast. However, to be effective, such woven fabric of metal or other materials would have to be continuous, not only about the periphery of the pipe but also for substantial lengths of the pipe. It will be seen that the embedding of an elongated tube of woven material in the cast-in-place concrete would require extensive modification of the machines 14 for casting such pipe. The upper inner forms 24 would have to be somehow inserted within the elongated tube of woven material and the woven material would have to be somehow fed between the lower inner form member 20 and the bottom 11 of the ditch 10. Thus, the technical complications tend to become prohibitive.

In recent years, it has been proposed to reinforce concrete by uniformly distributing therein a random array of short lengths of fibers. Such fibers are made of high tensile strength material such as steel, plastic, glass, asbestos, or cotton, for example. Fibers of various shapes and sizes, as well as materials, have been used in concrete mixes of various compositions. In addition, various mixing techniques have been attempted.

Concrete mixes suitable for use in making cast-in-place concrete pipe as defined in the specification for cast-in-place nonreinforced concrete pipe published by the American Concrete Institute under Publication No. 346-70 can be effectively reinforced against cracking by gradually adding fibers having a diameter of 10 mils and a length between one-half inch and 2 inches to the mixed concrete in a ready-mix truck in the amount of two percent of the weight of such mixed concrete immediately prior to placing such mixed concrete in the hopper 16A of the mechanism 14 for casting the concrete pipe. The fibers are preferably made of steel having a roughened exterior surface, however fibers made of other materials having high tensile strength may be used.

The diameter of the fibers is critical in securing an even distribution of the fibers throughout the concrete although fibers of slightly larger or slightly smaller diameter could be used. If the fibers have a length less than one-half inch they will be less effective in reducing cracking of the pipe. Fibers having a length greater than 2 inches will introduce complications into the casting of the pipe by tending to protrude from the surfaces thereof or to clog the spaces between the form members as the pipe is cast. Similarly, if the amount of the fibers added to the mixed concrete is less than one-half percent of the weight of such concrete, such amount will be insufficient to contribute effectively to the reinforcement of the pipe. By the same token, if the amount of fibers added to the concrete is greater than about four percent, such amount will tend to complicate the casting of the pipe by protruding from the sides thereof and clogging the spaces between the form members of the mechanism 14.

If the fibers are added to the mixed concrete too soon, then the continued mixing of the concrete as it is transported to the point of utilization will tend to cause the fibers to "ball up" within the mix, producing compact concentrations of the fibers rather than an even distribution of the fibers throughout the concrete. Thus it is important that the fibers be gradually added to the mixed concrete in the ready-mix truck immediately prior to supplying such concrete to the hopper 16A of the mechanism 14.

Referring to FIG. 6 of the drawing, a fragmentary cross-sectional view of a portion of the concrete pipe cast in accordance with the teaching of this invention is shown. It will be seen that the fibers 40 are evenly distributed throughout the concrete 13 which forms the wall of the pipe and that their orientation is random with respect to each other so that they are interlaced throughout the body of the pipe. Thus, if a crack or other imperfection should occur in the pipe after casting, the tensile stress resulting from such crack or flaw will be transferred to one or more of the fibers thus preventing the crack from growing very large and contributing not only to the ultimate tensile strength of the concrete but also to the prevention of the formation of large cracks which might extend all the way through the pipe. The fibers will also contribute to the resistance of the pipe to thermal shock when they are made of materials having good thermal conductivity such as metal. Thus, the pipe made according to the teaching of this invention will exhibit improved resistance to various conditions encountered in use. Furthermore, the concrete pipe according to the teaching of this invention, may be cast in place by the mechanisms 14 currently in use without modification in such mechanisms and the pipe may be made of concrete according to the specifications developed for use with such mechanisms for forming cast-in-place concrete pipe in a substantially continuous manner. Although fibers of various materials having dimensions within the range disclosed above and when added to the mixed concrete in an amount within the range disclosed above may be used, metal fibers with roughened exterior surfaces are preferred. Finally, it has been found that an amount of fibers constituting about two percent of the weight of the concrete in the pipe provides the best reinforcement with minimum complications in casting the pipe and minimum undesirable effects on other characteristics of the pipe as cast.

What is claimed is:

1. In the method of making cast-in-place concrete pipe, which method includes the steps of:
    (a) digging a ditch in the ground having a bottom portion shaped to conform to the part of the pipe to be cast directly in the ground;
    (b) moving a mechanism lengthwise in said ditch, which mechanism is adapted to receive and distribute concrete to form said pipe in a continuous manner within said ditch;
    (c) loading a quantity of a concrete mix suitable for use in making cast-in-place concrete pipe into a ready-mix truck at a central supply point remote from said mechanism;
    (d) transporting and mixing said quantity of concrete mix in transit from said central supply point to said mechanism; and
    (e) introducing said quantity of concrete mix into said mechanism for formation of said pipe;
    the improvement comprising the additional steps of:
    (f) forming a plurality of fibers each having a diameter of about 10 mils and a length between about $\frac{1}{2}$ and about 2 inches;
    (g) transporting a quantity of said fibers to said mechanism for forming said pipe; and
    (h) gradually adding said fibers to said quantity of concrete mix in said ready-mix truck at said mechanism in an amount by weight of about 2% of the weight of the quantity of concrete mix in said ready-mix truck immediately prior to introducing said quantity of concrete mix into said mechanism.

* * * * *